Figure 1:
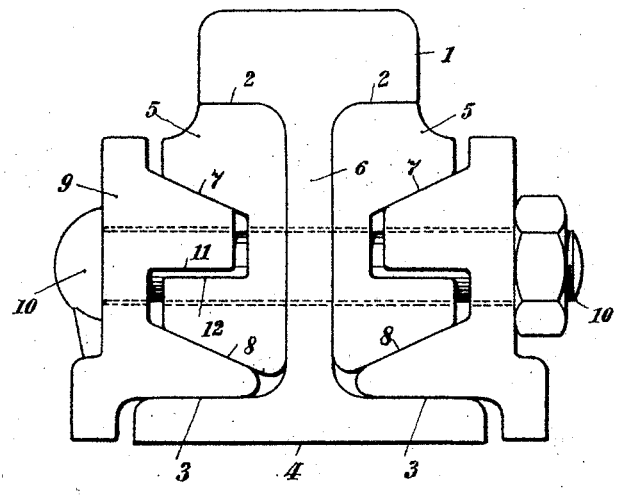

March 22, 1932.  G. YSEBOODT  1,850,163
RAIL JOINT CONNECTION
Filed Aug. 20, 1930

Inventor:
Gustave Yseboodt

Patented Mar. 22, 1932

1,850,163

UNITED STATES PATENT OFFICE

GUSTAVE YSEBOODT, OF SCHAERBEEK-BRUSSELS, BELGIUM

RAIL JOINT CONNECTION

Application filed August 20, 1930, Serial No. 476,581, and in Germany August 21, 1929.

The ordinary fish-plates of rail joint connections have supporting surfaces with a comparatively steep inclination relative to the bearing surface of the rail base, the corresponding surface of the rail having the same inclination.

The mass of the material rendered necessary by this steep inclination in the lower part of the rail head has only little value as regards the resistance of the rail, for on the one hand these inclined surfaces extend over the entire length of the rail and on the other hand are situated too near the axis of the centre of gravity.

Moreover through these inclined surfaces the upper part of the fish plate can approach the web of the rail, even if the fastening bolts of the rail joint connection are screwed absolutely tight, whereas the lower part moves away from the rail web or inversely.

The angular displacement increases however as soon as the bolts loosen but slightly, wherefrom results a rounding of the faces of the fish-plates, even with comparatively new rails, at the running of trains on the tracks, and consequently a premature wear of rail and connection at the joint which, even when screwed tight, offer sufficient resistance neither in vertical nor horizontal direction.

By the connection at the joint according to the invention these objections are overcome, in that the rails to be connected at the joint faces have supporting surfaces for the fish plates, which surfaces extend parallel or approximately parallel to the bearing face of the rail base and merge into the web of the rail.

Moreover, on both sides of each rail web two fish-plates are provided, one of which bears immovably against the webs and a bearing surface of the rails and has slide surfaces having the same inclination in angles open towards the outer side and formed by these surfaces, whereas the other fish-plate engages like a wedge in the open angle and comes into intimate contact through tightening of the bolts, on the one hand with the inclined slide surfaces and on the other hand with the other bearing surface of the rails, so that by tightening the fixing bolts, both a vertical as also a horizontal pressing on of all elements of the rail joint connection and a perfect, both vertical, as also lateral and angular immovability of both fish plates is attained.

By removing the possibility of an angular shifting of position of the fish-plates, even in the event of a slight loosening of the fixing bolts when in service, not only the life of the rails and fish-plates is considerably prolonged, but a great saving is effected because with rails of the same weight such a connection at the joint renders it possible to very considerably increase the resistance of the rails, owing to better distribution of the mass of material of the rails relative to the axis of the centre of gravity and conversely to considerably reduce the weight of the rails for the same resistance thereof.

The fish-plates and the rails may be produced by the ordinary rolling process without any re-fashioning work, as has to be performed on the known rails and fish-plates.

Two embodiments of the invention are illustrated by way of example in the accompanying drawings in which Fig. 1 shows in end elevation the preferred form of construction.

Figure 2:
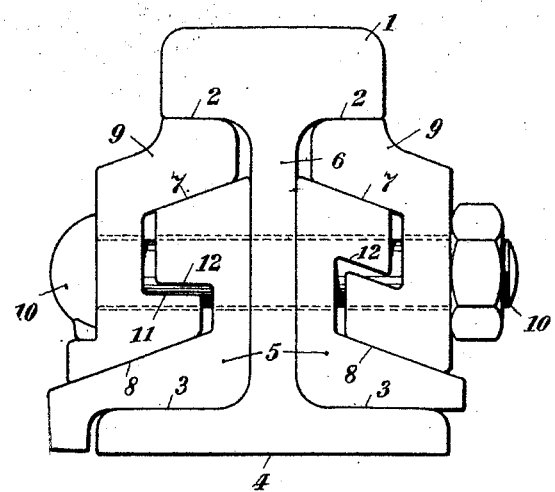

Fig. 2 is a similar view to Fig. 1 showing the second form of construction.

In the form of construction shown in Fig. 1 the rail 1 has surfaces 2 and 3 extending parallel or approximately parallel to the bearing surface 4 of the rail.

The fish-plates 5 bear against the surfaces 2 and against the web 6 of the two rails. They each have two inclined slide surfaces 7 and 8, which form with the surfaces 3 of the rails angles open towards the outer side. The fish-plates 9 engage wedge-like in the open angle of the fish-plates 5 and bear, on the one hand against the slide surfaces 7 and 8 and, on the other hand against the surfaces 3, the surfaces 11 and 12 of the fish-plates 9 and 5 leaving sufficient clearance between themselves.

After the complete tightening of the nut bolts 10 the fish-plates 9 press the other fish-plates 5 in vertical direction against the supporting surfaces 2 and in horizontal direction against the web 6 of the rails. Rails and fish-plates form thereby a complete rigid whole, as there is no possibility of movement in any direction.

The form of construction shown in Fig. 2 differs from that which has just been described only in that the fish-plates 5 bear against the web 6 and the lower surfaces 3, the fish-plates 9 however against the upper surfaces 2 of the rails 6.

On the left hand portion of Fig. 2 is shown that the surfaces 11 and 12 extend as in Fig. 1, i. e. perpendicularly to the web 6, so that they move the one towards the other when the nut bolts 10 are being tightened.

On the right hand portion of the Fig. 2 is shown that the surfaces 11 and 12 extend parallel to the surfaces 7 and 8 of the fish-plates, so that at the tightening of the nut bolts 10 no approaching takes place; the interval between both surfaces may therefore be kept very small.

The fish-plates 5 and 9 according to both forms of construction may evidently extend over the entire length of the connection on both sides of the rails. It is, however, also possible to subdivide one of the fish-plates at the middle or to provide only single short sections of the same at the points of the connection through which the nut bolts extend, it being supposed that then the other continuous fish-plate possesses sufficient resistance.

I claim:—

A rail joint connection comprising the combination of a rail having on the lower surface of its head and the upper side of its foot bearing surfaces extending substantially parallel to the rail base and merging into the web of the rail, with two fish-plates on either side of the rail web, the inner one of each pair of fish-plates bearing rigidly against the web and one of the bearing surfaces of the rail and having slide surfaces of similar inclination in angle open towards the outer side formed by the slide surfaces and the other supporting surface, whereas the outer fish-plate engages like a wedge into said open angle and comes by tightening of the nut bolts into intimate contact on the one hand with said inclined slide surfaces and on the other hand with the other bearing surface of the rail, a vertical and also a horizontal pressing on of all elements of the connection at the joint and a vertical, lateral and angular immovability of both fish-plates being obtained by the tightening of the nut bolts.

In testimony whereof I affix my signature.

GUSTAVE YSEBOODT.